US008219687B2

(12) United States Patent
Huang et al.

(10) Patent No.: US 8,219,687 B2
(45) Date of Patent: Jul. 10, 2012

(54) IMPLEMENTING BROWSER BASED HYPERTEXT TRANSFER PROTOCOL SESSION STORAGE

(75) Inventors: Shiling Huang, Austin, TX (US); Sean Michael Sundberg, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1151 days.

(21) Appl. No.: 11/969,653

(22) Filed: Jan. 4, 2008

(65) Prior Publication Data

US 2009/0177956 A1    Jul. 9, 2009

(51) Int. Cl.
*G06F 15/16* (2006.01)
(52) U.S. Cl. ......... 709/227; 709/228; 709/217; 715/221
(58) Field of Classification Search .................. 709/227, 709/228, 217; 715/221; 713/201
See application file for complete search history.

(56) References Cited

U.S. PATENT DOCUMENTS

| 7,860,974 B2 * | 12/2010 | Stienhans ..................... 709/227 |
| 2005/0149759 A1 * | 7/2005 | Vishwanath et al. ......... 713/201 |
| 2006/0136593 A1 * | 6/2006 | Silky et al. ................... 709/227 |

OTHER PUBLICATIONS

Murray, "Storing Secure Session State on the Client", May 17, 2005, Greg Murray's Blog, pp. 1-4 http://weblogs.java.net/blog.gmurray71/archive/2005/05/storing_secure.html.
"Guidelines, Patterns and code for end-to-end Java applications", retrieved Sep. 14, 2007, pp. 1-4. http://java.sun.com/blueprints/qanda/client_tier/session_state.html.
"Using Sessions and Session Persistence in Web Applications", bea, retrieved Sep. 14, 2007, pp. 1-9. http://edocs.bea.com/wls/docs81/webapp/sessions.html.
"Session Persistence—Improving Performance Using WebSphere and DB2 UDB", IBM, retrieved Sep. 14, 2007,pp. 1-10. http://www-128.ibm.com/developerworks/db2/library/techarticle/0203kitchlu/.

* cited by examiner

*Primary Examiner* — Kyung H Shin
(74) *Attorney, Agent, or Firm* — Yee & Associates, P.C.; David A. Mims, Jr.

(57) ABSTRACT

A computer implemented method, apparatus, and computer usable program product for managing session data. The process determines whether preexisting session data associated with a request for content is present in response to receiving the request. Responsive to an absence of the preexisting session data being associated with the request, the process generates session data associated with the request. The process then generates a response page having a set of forms including a set of hidden fields. The set of hidden fields include the session data. Thereafter, the process sends the response page to a client browser.

14 Claims, 7 Drawing Sheets

```
         <html>
         <body>
502 ⎯⎯ <form>
         <input type = "text"...>
504 ⎯⎯ <input type = "hidden"
             name = "session_data"
             value = session object data, timestamp, MAC
                         /              \          \
                        506             508        510
         </form>
         </body>
         </html>
500 ⎯⎯ Response Page
```

IMPLEMENTING BROWSER BASED HYPERTEXT TRANSFER PROTOCOL SESSION STORAGE

BACKGROUND OF THE INVENTION

1. Field of the Invention

The present invention relates generally to an improved data processing system and in particular, to a computer implemented method and apparatus for managing web applications. More particularly, the present invention is directed to a computer implemented method, apparatus, and computer usable program product for storing Hypertext Transfer Protocol (HTTP) session data in a browser to introduce states in object oriented programming language-based Web applications.

2. Description of the Related Art

The content of a JAVA™-based web page is dynamically generated by a web application in response to receiving a request from a client browser. The requested content is then presented to the browser in a response page. The exchange of requests and response pages may occur via Hypertext Transfer Protocol.

Hypertext Transfer Protocol is a communications protocol used to exchange information on the World Wide Web. Specifically, Hypertext Transfer Protocol is a stateless request/response protocol for exchanging information between clients and servers. A stateless protocol is a protocol that treats each request as an independent transaction unrelated to previous requests. One consequence of statelessness is that a web application is unable to correlate different, related requests that originate from a single browser. For example, if a user selects a series of items on one web page and navigates to another web page, the selected items will be lost.

Session data is persistent data that is maintained during a session to correlate one request to another. The session data consists of session variables generated by the web application while the user navigates the pages of the web application. The session data may identify a user's preferences or prior selections. Session data is identified by a session ID that relates to a series of related requests and responses between clients and servers. Thus, a subsequent exchange of requests and responses of a communications session may be associated with one another. For example, a buyer visiting a seller's web site may select items for purchase. The items may be placed in a virtual shopping cart, which is implemented as session data, as the items are found on the web site. The buyer may then proceed to a checkout page. This interaction involves an ongoing exchange of messages: requests from the client and responses from a server. The session ID enables the web server to keep track of the items placed in the buyer's virtual shopping cart.

One currently used method for persisting session data is by storing session data in cookies. Cookies are text files stored on a user's computer by a web browser at the request of a web application. This type of data is stored on a persistent storage, such as a hard disk drive. Cookies include information to identify clients that have previously interacted with the web application. Thus, in response to subsequent requests to a web application by a client browser, a web application may retrieve the session data. However, a common problem associated with the use of cookies that browser settings may prevent the storage of cookies. Another problem may be the intentional or unintentional removal of stored cookies by users. Further, the cookies are stored in memory. Consequently, the server's available memory and other resources may be rapidly depleted, especially in the instance where a large number of unique users are engaged in a communications session with the web application.

Another currently used method for persisting session data is the implementation of URL rewriting. A uniform resource locator (URL) is an Internet address. Uniform resource locator rewriting is a process by which the URL is modified to include a session ID. Web applications may then use the session ID to identify the session data stored in memory. However, memory is also used for each session. Thus, a common problem with URL rewriting is the depletion of server resources. In addition, session data stored in memory, either via URL rewriting or cookies, may be subject to session replication. Session replication is the replication of session data created on one node is made available to all other nodes. Session replication consumes additional server resources. In addition, errors in session data replication may prevent the web application from working properly.

Another currently used method for persisting session data is the storage of session data in a database. In this method, the database stores session data that can be correlated to a session ID stored in a cookie or in a URL that has been modified by URL rewriting. However, a problem associated with databases for storing session data is that databases are more expensive to use and may result in additional costs associated with database maintenance. In addition, retrieval of session data from a database is slower than retrieval of session data from memory. Further, database failure or database maintenance that may prevent access to the database renders the session data unavailable.

The currently used methods identified above for persisting session data have well known problems associated therewith as identified above. Therefore, it would be advantageous to have a method and apparatus for creating, storing, and retrieving session data in a manner that overcomes the above described problems.

SUMMARY OF THE INVENTION

The illustrative embodiments described herein provide a computer implemented method, apparatus, and computer usable program product for managing session data by determining whether preexisting session data associated with a request for content is present in response to receiving the request. Responsive to an absence of the preexisting session data being associated with the request, generating session data associated with the request. Then generating a response page having a set of forms including a set of hidden fields. The set of hidden fields include the session data. Thereafter, sending the response page to a client browser

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
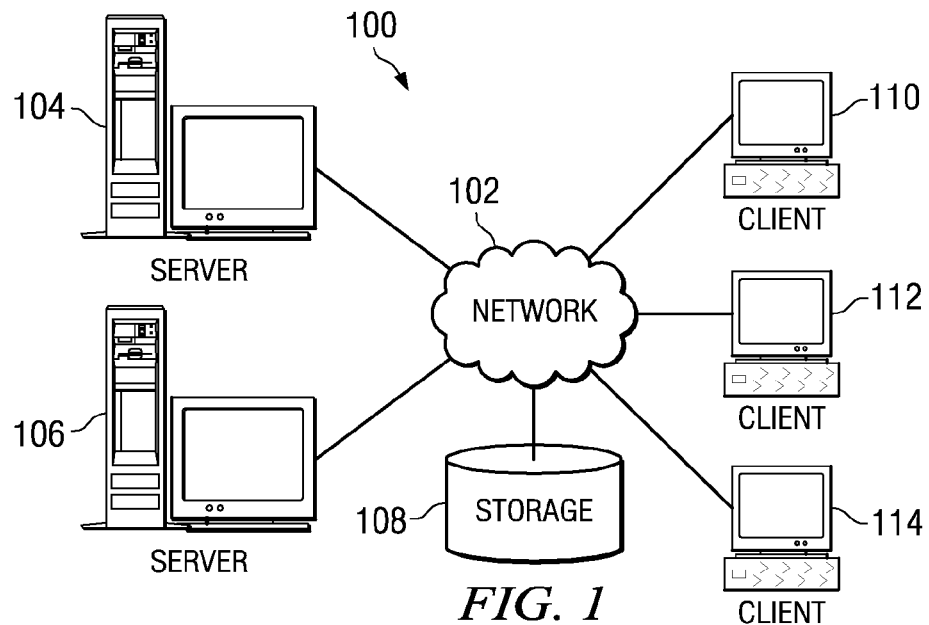
FIG. 1 is a pictorial representation of a network data processing system in which illustrative embodiments may be implemented.
Figure 2:
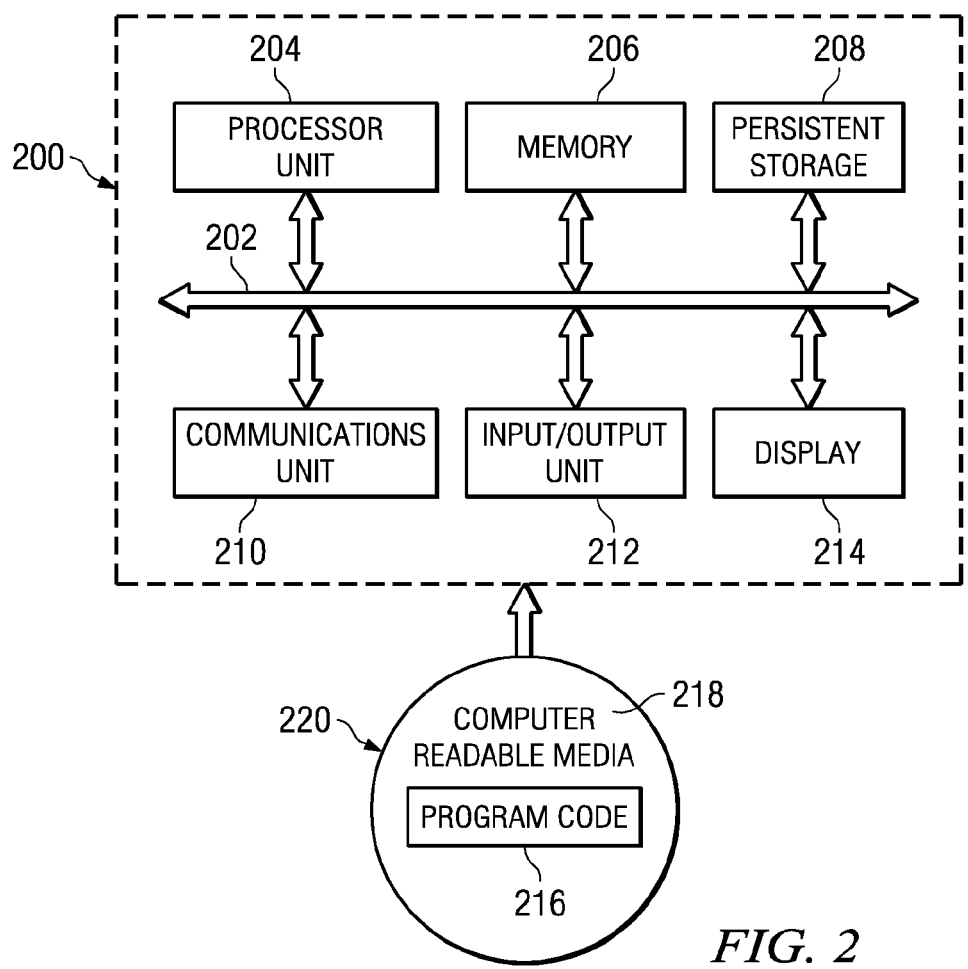
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing system in which illustrative embodiments may be implemented. Network data processing system 100 is a network of computing devices in which embodiments may be implemented. Network data processing system 100 contains network 102, which is the medium used to provide communications links between various devices and computers connected together within network data processing system 100. Network 102 may include connections, such as wire, wireless communications links, or fiber optic cables. The depicted example in FIG. 1 is not meant to imply architectural limitations. For example, data processing system 100 also may be a network of telephone subscribers and users.

In the depicted example, server 104 and server 106 connect to network 102 along with storage unit 108. In addition, clients 110, 112, and 114 are coupled to network 102. Clients 110, 112, and 114 are examples of devices that may be utilized for accessing content from a JAVA-based web application in accordance with an illustrative embodiment. The web application may be hosted by a server, such as server 104. Communication between a client and server may occur over a network, such as network 102.

Clients 110, 112, and 114 may be, for example, a personal computer, a laptop, a tablet PC, a network computer, a hardwired telephone, a cellular phone, a voice over internet communications device, or any other communications device or computing device capable of transmitting data. In the depicted example, server 104 provides data, such as boot files, operating system images, and applications to clients 110, 112, and 114. Clients 110, 112, and 114 are coupled to server 104 in this example. Network data processing system 100 may include additional servers, clients, computing devices, and other devices. The clients and servers of network data processing system 100 may be used to store Hypertext Transfer Protocol (HTTP) session data in a browser for introducing states in object oriented programming language-based web applications. For example, requests generated at client 110 may be processed by a web server, such as server 104. A web application hosted on the web server may perform its business logic and generate session data for insertion into a response page, as described in more detail below.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as, for example, an intranet, a local area network (LAN), a wide area network (WAN), a telephone network, or a satellite network. FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive or a flash memory that is connected to data processing system 200. The tangible form of computer readable media 218 is also referred to as computer recordable storage media.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

For example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, memory 206 or a cache. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

The illustrative embodiments described herein provide a computer implemented method, apparatus, and computer usable program product for managing session data. The process determines whether preexisting session data associated with a request for content is present in response to receiving the request. Responsive to the preexisting session data being associated with the request, the process generates session data associated with the request. The process then generates a response page having a set of forms including a set of hidden fields. The set of hidden fields include the session data. Thereafter, the process sends the response page to a client browser. As used herein, "a set" refers to one or more. Thus, a set of forms means one or more forms.

According to an illustrative embodiment, the session data may be inserted into hidden fields of a response page by a data object session component after generation of the response page but prior to sending the response page to a client browser. A data object session component is a server component operable to process session data. In this example, the data object session component populates hidden fields of the response page by searching for <form> tags and inserting the requisite session data.

In another illustrative embodiment, where a web framework application generates the response page, the session component may generate hidden field objects storing session data. The web framework application then inserts hidden field objects within the form fields before a servlet container generates the response page. As a result, the session component is not required to perform a subsequent search for <form> tags.

Figures 3, 5:
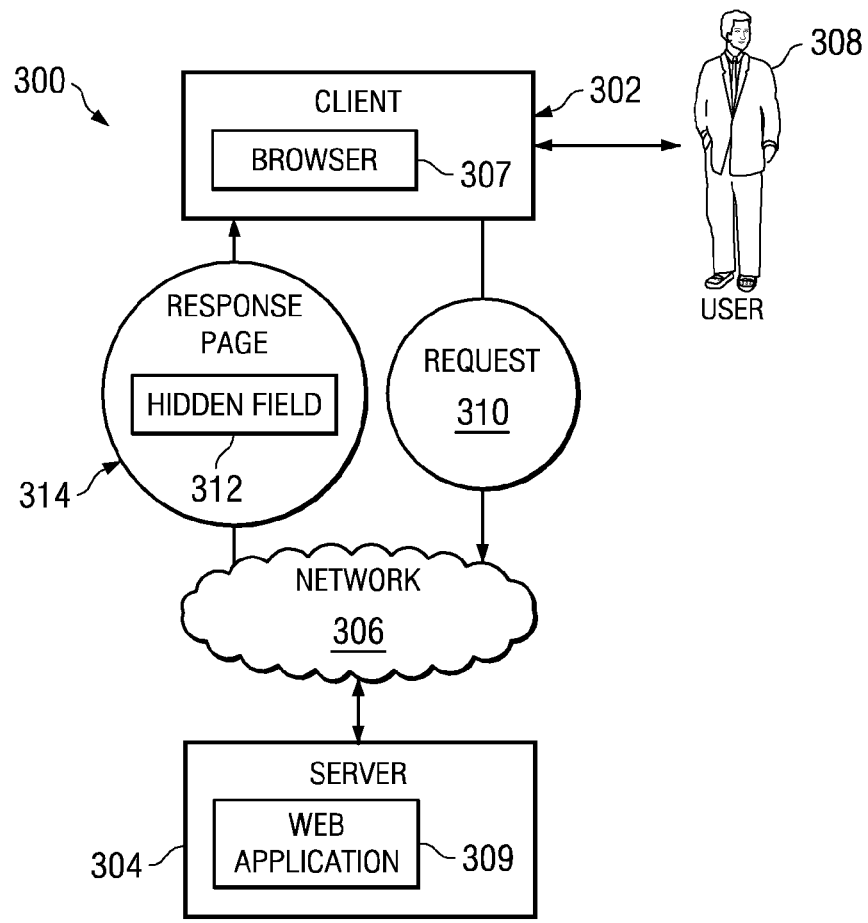
FIG. 3 is a diagram of a data processing system for implementing browser based Hypertext Transfer Protocol session storage in accordance with an illustrative embodiment.
FIG. 5 is a diagram of a response page having hidden fields in accordance with an illustrative embodiment.

FIG. 3 is a diagram of a data processing system for implementing browser based Hypertext Transfer Protocol session storage in accordance with an illustrative embodiment. Network data processing system 300 is a network data processing system such as network data processing system 100 in FIG. 1.

In this illustrative example in FIG. 3, network data processing system 300 facilitates the exchange of requests and responses between client 302 and server 304 over network 306. Client 302 is a client such as client 110 in FIG. 1. Similarly, server 304 is a server such as server 104 in FIG. 1. In addition, network 306 is a network, such as network 102 in FIG. 1.

Browser 307 executes on client 302. Browser 307 is a software application used to search a collection of data in a network data processing system. This type of application may enable a user to display and interact with collections of data, such as, for example, text, images, videos, music, and other information. This information may be presented by browser 307 on a web page over a network, such as the Internet or a local area network. Browser 307 may be, for example, Mozilla Firefox®, Internet Explorer®, and Netscape Navigator®. Mozilla Firefox is a registered trademark of Mozilla Corporation. Internet Explorer is a registered trademark of Microsoft Corporation. Netscape Navigator is a registered trademark of Netscape Communications Corporation.

User 308 operates browser 307 to interact with web application 309 hosted on server 304. Web application 309 is a software application having computer code for processing requests. Web application 309 is accessible to users over a network, such as an intranet or the Internet. Web application 309 is hosted by server 304. Web application 309 may be, for example, an online auction site, an email application, a social networking application, or a retail web site. Thus, where web application 309 is an online auction site, a request processed by web application 309 may be the selection of retail items for placement in a virtual shopping cart and the subsequent purchase of the retail items.

Based upon the input of user 308, browser 307 generates request 310. Request 310 is a request for content and is directed to server 304. Request 310 may be, for example, a selection of items for purchase from an online retail site.

User 308 may select multiple items from a number of different web pages. Without maintaining session data, items selected by user 308 would not persist from one web page to another. Consequently, the user would have to reselect the items as the user navigates a particular web site. In this illustrative example, session data is stored in hidden field 312 of response page 314.

In these examples, response page 314 is a web page containing information requested in request 310. Hidden field 312 is a form field invisible to a user operating browser 307 to interact with a web server providing response page 314. The hypertext markup language code for delineating hidden fields follows the form: <input type="hidden"/>. In this illustrative embodiment, hidden field 312 includes session data that may be persisted to correlate subsequent, related requests. Thus, for example, if user 308 operates browser 307 to modify a data entry form presented by server 304, hidden field 312 of response page 314 is modified to include session data describing the input provided by the user.

Figure 4:
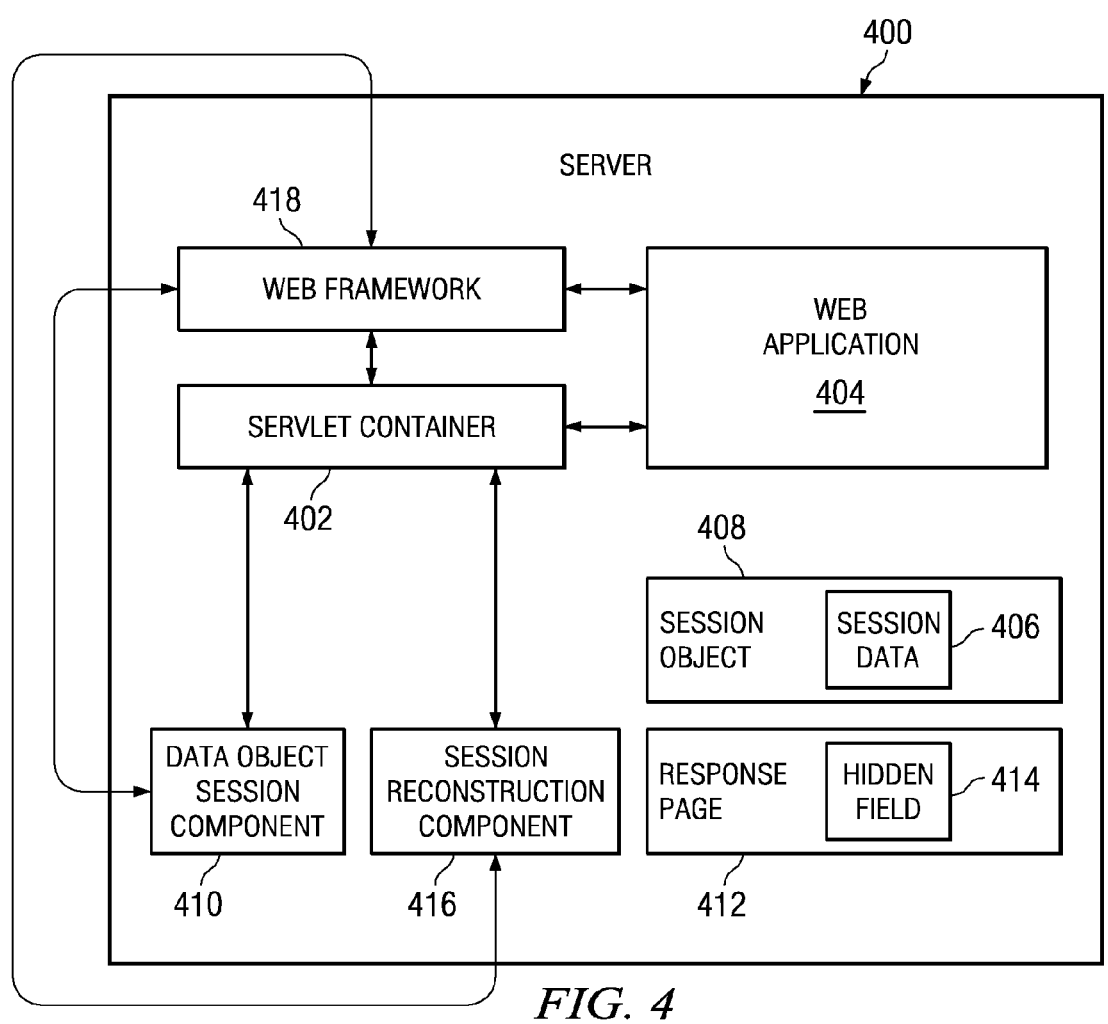
FIG. 4 is a diagram of a server for implementing browser based Hypertext Transfer Protocol session storage, in accordance with an illustrative embodiment.

FIG. 4 is a block diagram of web server for storing Hypertext Transfer Protocol session data in a browser for introducing states in object oriented programming language-based web applications. Server 400 is a web server, such as server 304 in FIG. 3. Server 400 receives requests for content, such as request 310 in FIG. 3, processes the request, and returns a response page having session data stored in a hidden field. Server 400 may return a response page such as response page 314 in FIG. 3.

Server 400 includes servlet container 402. Servlet container 402 is a compiled, executable web server component that facilitates the execution of web applications. In particular, servlet container 402 functions as an intermediary between a web server and the servlets in the container. The container loads, initializes, and executes the servlets. Individual servlets are registered with servlet container 402, providing servlet container 402 with information about what functionality they provide, and what URL or other resource locator they will use to identify themselves.

Servlet container 402 then initializes a particular servlet as necessary and delivers requests to the servlet as they arrive. Examples of servlet container 402 may include, without limitation, IBM Websphere® Application Server, Apache Tomcat™, and Java® System Application Server. Websphere is a registered trademark of International Business Machines Corporation. JAVA is a registered trademark of Sun Microsystems, Inc. Apache Tomcat is a trademark of Apache Software Company.

Server 400 also includes web application 404. Web application 404 is a web application such as web application 309 in FIG. 3. Web application 404 includes computer code for processing requests. During the processing of requests, web application 404 may generate session data 406 persisted throughout a series of requests. Session data 406 is data persisted during a session to correlate related requests. Session data 406 may include session variables generated by the web application. A session variable is identified by a session identifier. This session variable may include, for example, a user's name and contact information, selections that a user has made during a particular session, or other personal or business-related information.

In this illustrative example in FIG. 4, session data 406 is stored in session object 408. Session object 408 is an object defined in an object oriented programming language, such as JAVA®. Session object 408 is instantiated within web application 404. Session object 408 stores session data 406 in response to processing a request for content, such as request 310 in FIG. 3. Session data 406 and session object 408 implement the java.lang.serializable interface.

Server 400 includes data object session component 410. Data object session component 410 is a software component operable to serialize session data stored in session object 408. Serialization is the process by which session data stored in session objects, such as session object 408, is converted to a format that may be transported across a network or persisted to a storage location. The serialized format includes state information. The session in serialized format is then converted into text to form textual session data. Textual session data is session data in text form. The textual session data may then be inserted into a hidden field of a response page, such as response page 412. The process of serialization allows an object, such as session object 408, to be serialized, shipped across the network, persisted in a location, such as in a hidden field, and then be reconstructed for use at a later point in time by a session reconstruction component. Response page 412 is a response page such as response page 314 in FIG. 3. Response page includes hidden field 414. Hidden field 414 is a hidden field such as hidden field 312 in FIG. 3.

To introduce security, data object session component 410 may derive a timestamp and message authentication code for insertion into a hidden field of a response page. A message authentication code is a short item of information used to authenticate a message by detecting changes in the content from which the message authentication code is derived. The message authentication code may be calculated while serializing session object 408. In particular, data object session component 410 calculates the message authentication code by providing a message authentication algorithm, such as with a secret key and an arbitrary message to be authenticated. The message authentication code is the output of the message authentication algorithm. In alternate embodiments, however, any form of security feature and integrity protection may be implemented without departing from the scope of invention. In this illustrative embodiment, the arbitrary message to be authenticated is serialized session data 406 and a timestamp. A pre-selected secret key used for message authentication is stored on the server. A copy of the timestamp may be stored on server 400 for use in subsequent authentication. The timestamp may be stored in a session object, such as session object 408, or in other data storage, such as a database. The storage of the timestamp on server 400 requires minimal resources. For example, a timestamp for millisecond accuracy only requires 8 bytes for storage.

Additionally, server 400 includes session reconstruction component 416. Session reconstruction component 416 de-serializes session data associated with a series of requests. The session data is generated in response to receiving a request, and persisted for use in processing a subsequent request. De-serialization is a process for converting the serialized session data in hidden fields to de-serialized session data. The de-serialized session data is stored in a session object, such as session object 408. Once stored in a session object, web application 404 may use the session data to process a request. For example, the de-serialized session data in session object 408 may then be serialized for inclusion into a hidden field of a response page.

In an embodiment where security is enabled, session reconstruction component 416 may be required to authenticate the session data before de-serializing the session data. In one embodiment, authentication includes comparing the timestamp in the hidden field with the timestamp created and stored on server 400 at the time the session data was serialized. Additionally, during authentication, session reconstruction component 416 may recalculate a message authentication code using the session data in the hidden field, the timestamp, and a pre-selected secret key. If the recalculated message authentication code matches the message authentication code stored in the hidden field, then the session data is considered to be authentic and session reconstruction component 416 may de-serialize the session data. However, if session reconstruction component 416 is unable to authenticate the session data, then the session may be terminated.

In the illustrative embodiment of FIG. 4, data object session component 410 and session reconstruction component 416 are depicted as stand-alone software components. However, in an alternate embodiment, data object session component 410 and session reconstruction component 416 may be implemented as a part of servlet container 402.

In an illustrative example, a user operates a browser to access web application 404 hosted by server 400. The browser generates a request in response to the user's input. Servlet container 402 receives the request and passes control to the appropriate web application for further processing. Passing control to a component of a web application means invoking an operation that may be performed by the component. The component to which control is passed performs a processing task and, when complete, returns control back to servlet container 402. In this illustrative example, servlet container 402 passes control to web application 404 for processing the request from a client browser if the request lacks the presence of preexisting session data. Preexisting session data is session data generated in response to a prior request for content. Web application generates the session data associated with the newly received request.

During processing of the request, web application 404 generates session data 406. Web application 404 stores session data 406 in session object 408. Thereafter, web application 404 generates response page 412 having one or more forms and passes control back to servlet container 402. Subsequently, servlet container 402 passes control to data object session component 410 to serialize session data 406 stored in session object 408.

Data object session component 410 locates the form tags in response page 412 and inserts hidden field 414 into response page 412. Hidden field 414 includes serialized session data. Data object session component 410 removes session data 406 from session object 408 and passes control back to servlet container 402. Servlet container 402 generates the response page having a set of forms including a set of hidden fields. The set of hidden fields includes the session data. Servlet container 402 then forwards response page 412 to the client that generated the request.

In another example, servlet container 402 may receive a request for content having hidden fields populated with preexisting session data. In this example, the request is a subsequent request associated with a previous request. The preexisting session data is session data generated in a previous request and is included in the hidden fields. Responsive to receiving the request for content, servlet container 402 may detect the presence of the preexisting session data.

Upon receipt of this request, servlet container 402 passes control to session reconstruction component 416 to process the session data in the hidden fields. If security is enabled (by the web server administrator), then session reconstruction component 416 authenticates the session data before de-serializing the session data.

Once the session data is de-serialized and stored in a session object, session reconstruction component 416 passes control back to servlet container 402. Servlet container 402 then passes control to web application 404 for processing the subsequent request using the session data in the session object. If necessary, web application 404 may generate new session data associated with the newly received request, as in the instance where a user submits a newly generated request. The generation of new session data may include modifying preexisting session data.

In some instances, a new response page may be generated and returned to the client browser that generated the request. For example, the new response page may be generated and returned to the client browser if a user operating the client browser submitted a request for additional content. Thus, a user navigating a website selling retail items may select items from a first webpage. Thereafter, the user may navigate to a second webpage to select additional items. In this illustrative example, the second webpage is the new response page that is returned to the client browser.

After web application 404 has performed its business logic for processing a request, control is then passed from web application 404 to servlet container 402. Servlet container 402 passes control back to data object session component 410 for populating forms of the response page with hidden fields having session data. The response page may then be presented to the client browser by servlet container 402 after receiving control back from data object session component 410.

Server 400 may include a web framework application 418. Web framework application 418 is software framework designed to support the operation of dynamic web sites, web applications, and web services. Web frameworks, in general, aim to alleviate the overhead associated with common activities used in web applications. For example, web framework application 418 may provide libraries for tags, user input validation, and user input conversion. Web framework 418 may facilitate the generation of response pages after web application 404 has performed the necessary processing of the request.

Web framework 418 may be, for example, Apache Struts, Java Server Faces (JSF), or any other available or later developed web frameworks. Apache struts is a software framework offered by the Apache Software Foundation.

In the embodiment where web framework 418 is used, data object session component 410 generates hidden field objects storing session data, such as session data 406. Web framework application 418 inserts the hidden field objects containing the session data into one or more forms of the response page. Once web framework application 418 has completed inserting session data into the forms, servlet container 402 generates and sends the response page to a client browser. Use of web framework application 418 obviates the need for data object session component 410 to locate form tags in a response page. The operation of web framework application 418 is described in more detail in FIG. 7, below.

FIG. 5 is diagram of a response page having hidden fields in accordance with an illustrative embodiment. Response page 500 is a response page such as response page 314 in FIG. 3.

In accordance with an illustrative embodiment, response page 500 includes a form delineated by form tag 502. A form is a section of a web page containing content, markup, control elements, and control element labels. Users generally complete a form by modifying its controls, such as entering text and selecting menu items, before submitting the form to a web application for processing.

The form delineated by form tag 502 includes hidden field 504. Hidden field 504 is a hidden field such as hidden field 312 in FIG. 3. Hidden field 504 supplies information to the web application for processing. In this illustrative example, the information supplied in hidden field 504 is session data and data usable for implementing security features. In the illustrative example in FIG. 5, the session data is represented by session object data 506. Session object data 506 is session data that is stored, at least temporarily in a session object of a web server, such as session object 408 in FIG. 4. Hidden field 504 may be populated with session object data 506 by a session component, such as data object session component 410 in FIG. 4.

Session object data 506 may be secured by incorporating a timestamp and message authentication value into hidden field 504. Timestamp 508 is a session state variable included within hidden field 504. Timestamp 508 may be used to facilitate authentication of session object data 506. In particular, timestamp 508 included within hidden field 504 is compared with a corresponding timestamp stored in a session data object maintained in a web server. The two timestamps are created when session object data 506 is generated. If the timestamp values match, then session object data 506 is not presumptively inaccurate, wrong, or impermissibly altered.

Additionally, hidden field 504 includes message authentication code (MAC) 510. Message authentication code 510 is a hash value calculated from session data, timestamp 508, and a pre-selected, secret key (not shown). Message authentication code 510 is stored in hidden field 504 along with session object data 506. When a request page is returned to a web server, a session component, such as session reconstruction component 416 in FIG. 4, recalculates a message authentication code using the session data stored in session object data 506 and from timestamp 508. The session component then compares the newly calculated message authentication code with message authentication code 510. If the two values are equal, then session object data 506 is authenticated. Authentication verifies the integrity of the session data, and ensures that a malicious user has not attempted to modify the session data.

A servlet container, such as servlet container 402 in FIG. 4, sends response page 500 to a web browser, such as web browser 307 in FIG. 3. In this manner, session object data 506 in hidden field 504 may be used to persist selected information throughout subsequent exchanges of requests and response pages between a client and server.

Figure 6:
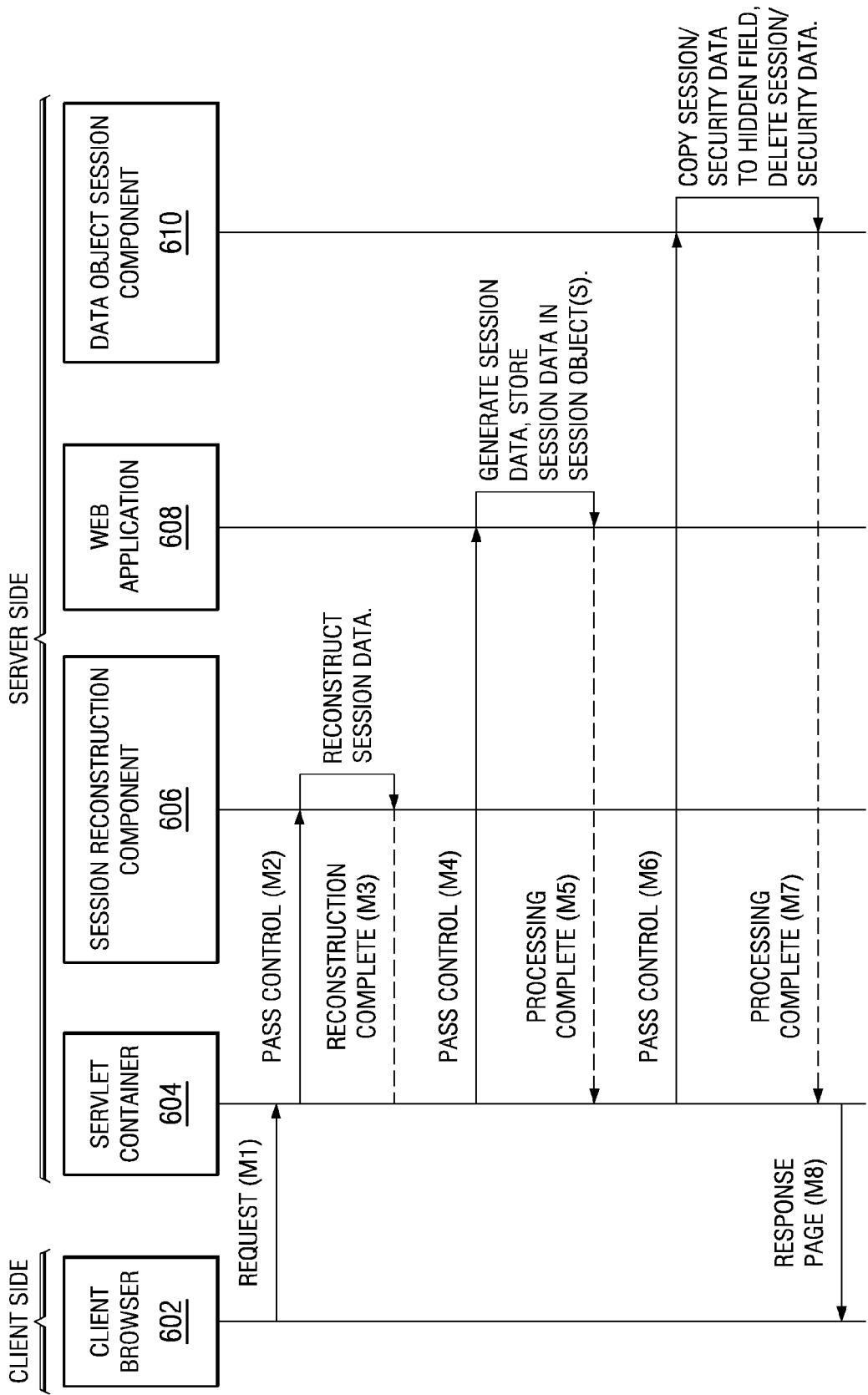
FIG. 6 is a message flow diagram illustrating message flow between components of a system for storing Hypertext Transfer Protocol session data in a browser for introducing states in object oriented programming language-based web applications in accordance with an illustrative embodiment.

FIG. 6 is a message flow diagram illustrating message flow between components of a system for storing Hypertext Transfer Protocol (HTTP) session data in a browser for introducing states in object oriented programming language-based web applications in accordance with an illustrative embodiment. In particular, FIG. 6 depicts the flow of messages between client browser 602, servlet container 604, session reconstruction component 606, web application 608, and data object session component 610.

Client browser 602 is a browser, such as browser 307 in FIG. 3. Servlet container 604 is a servlet container such as servlet container 402 in FIG. 4. Likewise session reconstruction component 606 and data object session component 610 are session components such as session reconstruction component 416 and data object session component 410 in FIG. 4, respectively. Web application 608 is a web application such as web application 404 in FIG. 4.

The message flow begins in this depicted example when servlet container 604 receives a request from client browser 602 (message M1). Servlet container 604 passes control to session reconstruction component 606 (message M2). Servlet container 604 passes control by calling session reconstruction component 606 to process the request received in message M1.

Session reconstruction component 606 reconstructs session data (if any) before notifying servlet container 604 that the reconstruction is complete (message M3). Thereafter, servlet container 604 passes control to web application 608 (message M4). Web application 608 generates session data and stores the session data in the session object(s) before notifying servlet container that processing is complete (message M5).

Servlet container 604 then passes control to data object session component 610 (message M6). Data object session component 610 copies the session data/security data to hidden fields of the response page and deletes the session data from the session object before notifying servlet container 604 that processing is complete (message M7). Servlet container 604 then sends the completed response page to client browser 602 (message M8).

Figure 7:
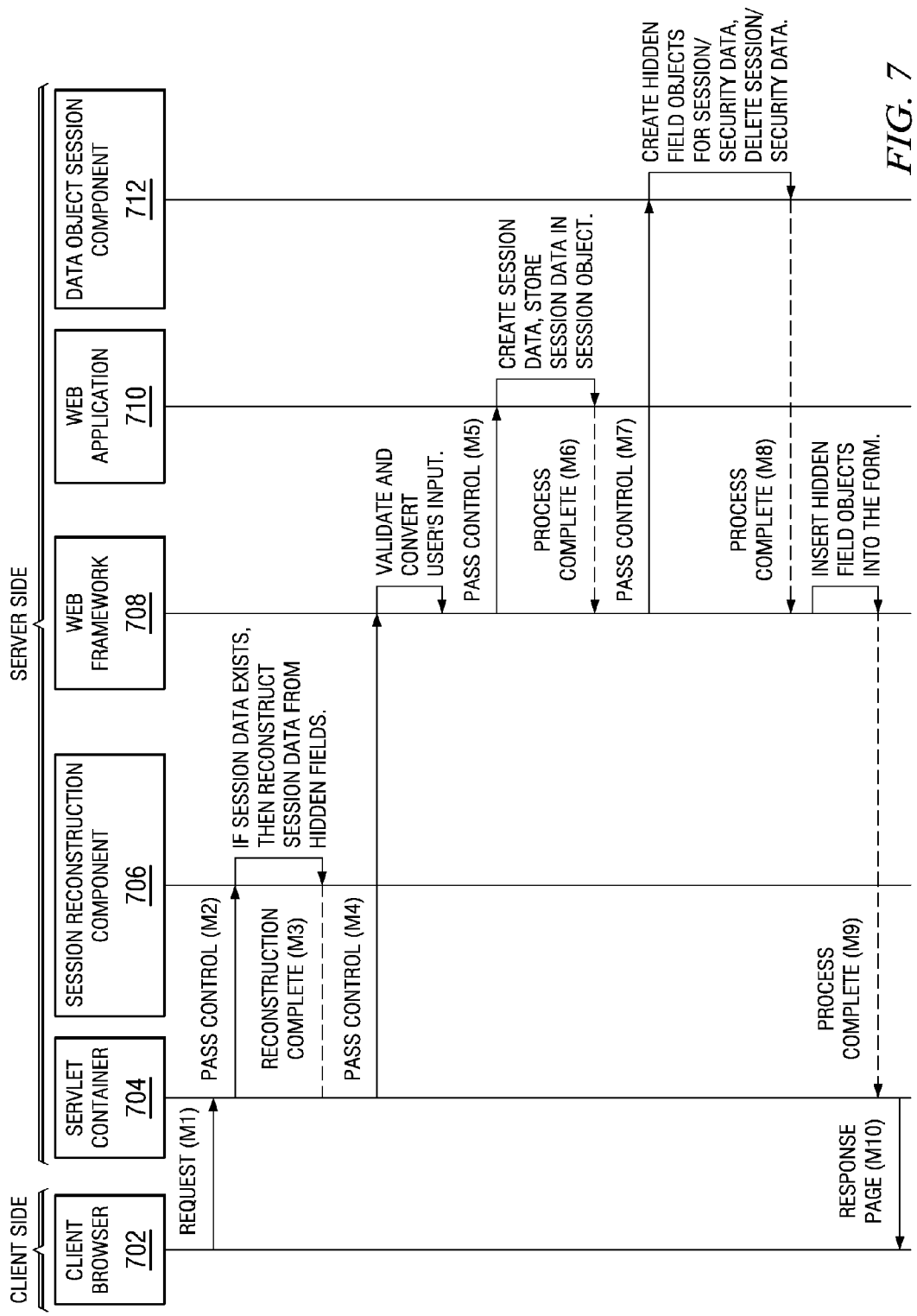
FIG. 7 is a message flow diagram illustrating message flow between components of a system implementing a web framework application for storing Hypertext Transfer Protocol session data in a browser for introducing states in object oriented programming language-based web applications in accordance with an illustrative embodiment.

FIG. 7 is a message flow diagram illustrating message flow between components of a system implementing a web framework application for storing Hypertext Transfer Protocol session data in a browser for introducing states in object oriented programming language-based web applications in accordance with an illustrative embodiment. In particular, FIG. 7 depicts the flow of messages between client browser 702, servlet container 704, session reconstruction component 706, web framework 708, web application 710, and data object session component 712.

Client browser 702 is a browser, such as browser 307 in FIG. 3. Servlet container 704 is a servlet container such as servlet container 402 in FIG. 4. Likewise session reconstruction component 706 and data object session component 712 are session components such as session reconstruction component 416 and data object session component 410 in FIG. 4, respectively. Web application 710 is a web application such as web application 404 in FIG. 4. In addition, web framework 708 is a web framework, such as web framework application 418 in FIG. 4.

The message flow begins when servlet container 704 receives a request from client browser 702 (message m1). Servlet container 704 passes control to session reconstruction component 706 (message m2). Servlet container 704 passes control by calling session reconstruction component 706 to process the request received in message m1.

Session reconstruction component 706 reconstructs session data from hidden fields if the session data exists. Session data exists if the request was a subsequent request related to a prior request having hidden fields containing session data. Thereafter, session reconstruction component 706 notifies servlet container 704 that the reconstruction is complete (message m3). Thereafter, servlet container 704 passes control to web framework 708 (message m4). Web framework 708 validates and converts the user's input before passing control to web application 710 (message m5). Web application 710 generates session data and stores the session data in the session object before notifying servlet container that processing is complete (message m6).

Web framework 708 then passes control to data object session component 712 (message m7). Data object session component 712 creates hidden field objects for session data/security data and deletes the session data from the session object before notifying web framework 708 that processing is complete (message m8). Web framework 708 inserts the hidden field objects into the form. When completed, web framework 708 notifies servlet container that the processing is complete (message m9). Servlet container 704 then generates the response page and sends the response page to client browser 702 (message m10).

Figure 8:
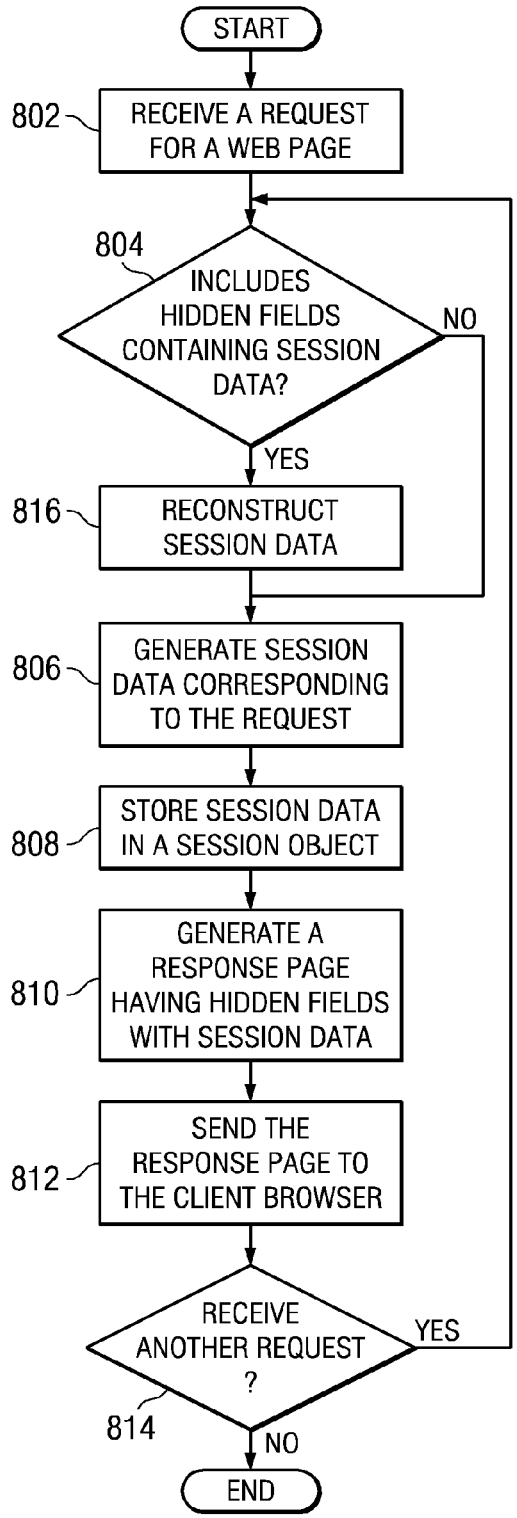
FIG. 8 is a flowchart of a process for processing hidden fields in accordance with an illustrative embodiment.

FIG. 8 is a flowchart of a process for storing session data in a browser for introducing states in object oriented programming language-based web applications. The process may be performed by a server, such as server 400 in FIG. 4.

The process begins by receiving a request for a web page (step 802). The request may be generated on a client browser. A determination as to whether the request includes hidden fields for session data (step 804). If the request does not include hidden fields for session data, then the request is a first request unrelated to any prior requests. However, if the request includes hidden fields for session data, then the request is a subsequent request associated with a prior request. The subsequent request includes information persisted from the prior request. The persisted information is stored in session data of the hidden fields.

If a determination is made that the request does not include session data, then session data corresponding to the request is generated (step 806). The session data is then stored in a session object (step 808). Thereafter, a response page having hidden fields with session data is generated (step 810). The response page is sent to the client browser (step 812). Subsequently, a determination is made as to whether another request has been received (step 814). If it is determined that another request has not been received, then the process terminates. Otherwise, the process returns to step 804.

At step 804, if it is determined that the request includes hidden fields for session data, then the session data is reconstructed (step 816) and session data corresponding to the request is generated at step 806. In this step, the preexisting session data may be modified to incorporate new session data.

Figure 9:
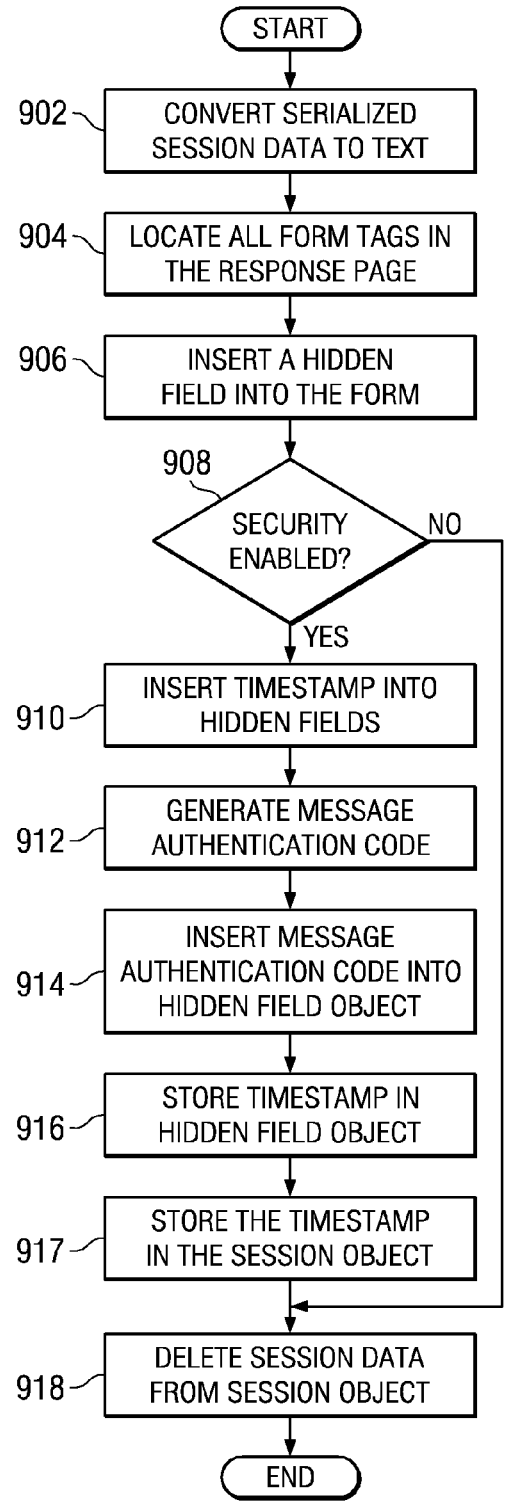
FIG. 9 is a flowchart of a process for populating hidden fields with session data in accordance with an illustrative embodiment.

FIG. 9 is a flowchart of a process for populating hidden fields with session data in accordance with an illustrative embodiment. The process may be performed by a software component such as data object session component 410 in FIG. 4.

The process begins by converting serialized session data to text (step 902). Then, form tags in the response page are located (step 904). Thereafter, hidden fields are inserted into the form (step 906). A response page may include one or more forms. Likewise, a response page may include one or more hidden fields containing session data.

A determination is then made as to whether security is enabled (step 908). If a determination is made that that security is enabled, then a timestamp is inserted into a hidden field object (step 910). A message authentication code is then generated (step 912). The message authentication code is generated from the timestamp, session data, and a secret key. Thereafter, the message authentication code is inserted into hidden field object (step 914). The timestamp is then inserted into a hidden field object (step 916). The timestamp is then stored in the session object (step 917). The session data is then deleted from the session object (step 918) and the process terminates thereafter.

Returning now to step 908, if a determination is made that security is not enabled, then the process proceeds to step 918.

Figure 10:
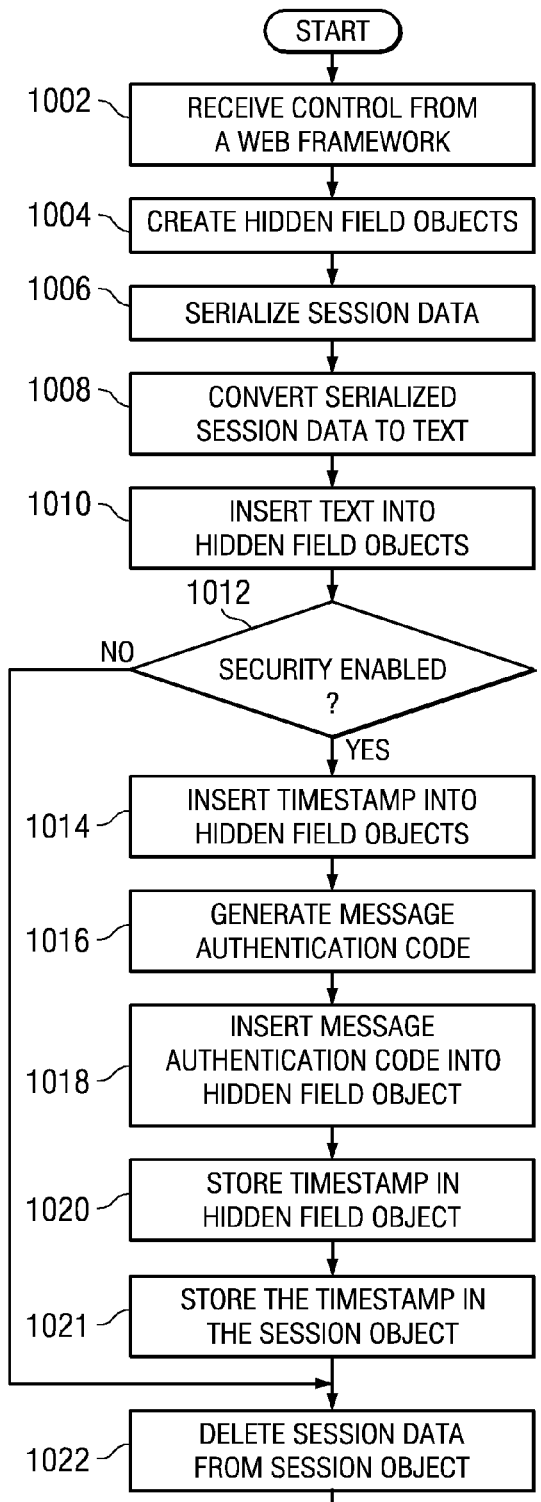
FIG. 10 is a flowchart of a process for generating hidden field objects for use in creating a response page having hidden fields including session data, in accordance with an illustrative embodiment.

FIG. 10 is a flowchart of a process for generating hidden field objects for use in creating a response page having hidden fields including session data in accordance with an illustrative embodiment. The process may be performed by a software component such as data object session component 410 in FIG. 4.

The process begins by receiving control from a web framework (step 1002). The web framework may be a web framework such as web framework 418 in FIG. 4. Hidden field objects are created (step 1004). The hidden field objects are objects that represent hidden field tags provided by a web framework. Hidden field objects store session data and optionally security-related data that are to be inserted into a hidden field of a response page. Session data is then serialized (step 1006) and converted to text (step 1008). Thereafter, the text is inserted into the hidden field objects (step 1010).

A determination is then made as to whether security is enabled (step 1012). If security is enabled, then a timestamp is inserted into a hidden field object (step 1014). A message authentication code is then generated (step 1016). The message authentication code is generated from the timestamp, session data, and a secret key. Thereafter, the message authentication code is inserted into hidden field object (step 1018). The timestamp is then stored in the hidden field object (step 1020). The timestamp is also stored in the session object (step 1021). Next, the session data is deleted from the session object (step 1022) and the process terminates thereafter.

Returning now to step 1012, if a determination is made that security is not enabled, then the process proceeds to step 1022.

Figure 11:
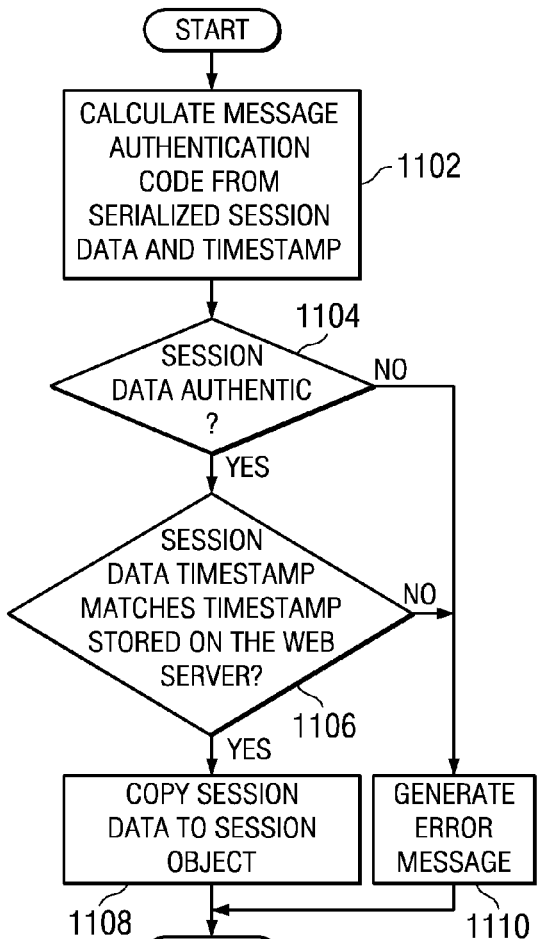
FIG. 11 is a flowchart of a process for reconstructing session data stored in a hidden field, in accordance with an illustrative embodiment.

FIG. 11 is a flowchart of a process for reconstructing session data stored in a hidden field in accordance with an illustrative embodiment. The process may be performed by a software component such as data object session component 410 in FIG. 4.

The process begins by calculating a message authentication code from the serialized session data and timestamp in the hidden fields of the submitted form (step 1102). A determination then made as to whether the session data is authentic (step 1104). The session data is authentic if a comparison of the newly calculated message authentication code matches the message authentication code stored in the hidden fields of the submitted form.

If the determination is made that the session data is authentic, then the determination is made as to whether the session data timestamp stored in the hidden field matches the timestamp stored on the web server (step 1106). If the session data timestamp matches the timestamp stored on the web server, then the session data is copied to the session object (step 1108) and the process terminates thereafter.

Returning now to step 1104, if the determination is made that the session data is not authentic, then an error message is generated (step 1110), and the process terminates thereafter. Similarly, at step 1106, if the determination is made that the session data timestamp does not match the timestamp stored on the web server, then an error message is generated at step 1110 and before the process terminates.

Once the session data has been copied to the session object, a web application, such as web application 404 in FIG. 4, may process the deserialized session data of the submitted form according to the web application's business logic. In addition, the web application may modify the session data to incorporate changes in accordance with the newly submitted request.

The flowcharts and block diagrams in the different depicted embodiments illustrate the architecture, functionality, and operation of some possible implementations of methods, apparatus, and computer usable program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The illustrative embodiments described herein provide a computer implemented method, apparatus, and computer usable program product for managing session data. The process determines whether preexisting session data associated with a request for content is present in response to receiving the request. Responsive to an absence of the preexisting session data being associated with the request, the process generates session data associated with the request. The process then generates a response page having a set of forms including a set of hidden fields. The set of hidden fields include the session data. Thereafter, the process sends the response page to a client browser.

The computer implemented method and apparatus disclosed herein facilitates the management of browser-based session data. Because the session data may not be stored in memory, a web application may support multiple users. Furthermore, session data may be maintained even if a user of a client computer disables the use of cookies.

Session replication is not needed in clustered environments if security is not enabled because the session data is stored in the hidden fields of the request and/or the response pages transmitted between the client and server. Session replication is minimized if security is enabled because the only data in session is the timestamp that requires minimal storage space. Also, application server failure would not affect the session data stored in the response page if security is not enabled. If security is enabled, application server failure is less likely to occur due to session replication error because session replication is minimized.

In addition, because the session data may not be stored in memory, web servers have no need to implement a time-out function or have no need to provide a long time-out, thereby permitting a user to spend as much time as necessary navigating web page options provided by a web application. Furthermore, application development is not impacted, and code changes are not required because the different illustrative embodiments described herein may be implemented in a manner that allows an application to use existing, standard methods and interfaces, such as those defined by a servlet API, to use the session data without concern of where the session data is stored. The described features provide the above-mentioned, non-limiting list of benefits that may be realized by implementing the computer implemented method and apparatus disclosed herein.

Other benefits may be recognized depending upon particular implementations. For example, although the descriptions presented herein were discussed with respect to JAVA-based applications, the storage of session data in hidden fields of browsers without requiring code change can also be applied to other technology based Web applications. For example, in alternate embodiments, the features disclosed herein may be applied to .Net based web applications. In this embodiment, the standard is written by Microsoft™ in the form of an API document and the functions of the servlet container described herein may be provided by .Net runtime on a Microsoft Windows operating system.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method of managing session data, the computer implemented method comprising:

responsive to receiving a request for content, determining whether preexisting serialized session data from a serialized session object associated with the request is present;

responsive to the preexisting serialized session data not being present, generating session data in a first session object associated with the request, creating a serialized session data from the first session object, calculating a message authentication code using a timestamp, the serialized session data, and a security key, generating a response page having a set of forms including a set of hidden fields comprising the serialized session data, the timestamp, and the message authentication code, and sending the response page to a client browser; and responsive to a presence of the preexisting serialized session data being associated with the request, wherein the preexisting serialized session data is in the set of hidden fields, de-serializing the preexisting serialized session data to form de-serialized session data, storing the de-serialized session data in a second session object, and processing the request using the de-serialized session data.

2. The computer implemented method of claim 1, further comprising:

responsive to the set of hidden fields having security data, authenticating the preexisting serialized session data in the set of hidden fields before de-serializing the preexisting serialized session data.

3. The computer implemented method of claim 2, wherein the security data comprises at least one of a timestamp and a message authentication code for authenticating the preexisting serialized session data.

4. The computer implemented method of claim 1, wherein generating the response page having hidden fields further comprises:

locating the set of forms of the response page; and
populating the set of forms with hidden fields comprising the serialized session data.

5. The computer implemented method of claim 1, wherein generating the response page having hidden fields further comprises:

generating hidden field objects storing the serialized session data; and
inserting the hidden field objects into the set of forms of the response page.

6. A computer program for managing session data, the computer program product comprising a non-transitory computer readable medium tangibly embodying computer usable program code thereon for:

determining whether preexisting serialized session data from a serialized session object associated with a request for content is present in response to receiving the request;

in response to the preexisting serialized session data not being present, generating session data in a first session object associated with the request, creating a serialized session data from the first session object, calculating a message authentication code using a timestamp, the serialized session data, and a security key, generating a response page having a set of forms including a set of hidden fields comprising the serialized session data, the timestamp, and the message authentication code, and sending the response page to a client browser; and in response to a presence of the preexisting serialized session data being associated with the request, wherein the preexisting serialized session data is in the set of hidden fields, de-serializing the preexisting serialized session data to form de-serialized session data, storing the de-serialized session data in a second session object, and processing the request using the de-serialized session data.

7. The computer program product of claim 6, wherein the computer usable program code further comprises computer usable program code for:

authenticating the preexisting serialized session data in the set of hidden fields before de-serializing the preexisting serialized session data in response to the set of hidden fields having security data, wherein the security data comprises at least one of a timestamp and a message authentication code for authenticating the preexisting serialized session data.

8. The computer program product of claim 6, wherein the computer usable program code for generating the response page having hidden fields further comprises computer usable program code for:

locating the set of forms of the response page; and
populating the set of forms with hidden fields comprising the serialized session data.

9. The computer program product of claim 6, wherein the computer usable program code for generating the response page having hidden fields further comprises computer usable program code for:

generating the hidden field objects storing the serialized session data; and
inserting the hidden field objects into the set of forms of the response page.

10. An apparatus comprising:
a bus system;
a communications system connected to the bus system;
a memory connected to the bus system, wherein the memory includes computer usable program code; and
a processing unit connected to the bus system, wherein the processing unit executes the computer usable program code to:

determine whether preexisting serialized session data from a serialized session object associated with a request for content is present in response to receiving the request;

in response to the preexisting serialized session data not being present, generate session data in a first session object associated with the request, create a serialized session data from the first session object, calculate a message authentication code using a timestamp, the serialized session data, and a security key, generate a response page having a set of forms including a set of hidden fields comprising the serialized session data, the timestamp, and the message authentication code, and send the response page to a client browser; and in response to a presence of the preexisting serialized session data being associated with the request, wherein the preexisting serialized session data is in the set of hidden fields, de-serialize the preexisting serialized session data to form de-serialized session data, store the de-serialized session data in a second session object, and process the request using the de-serialized session data.

11. The apparatus claim 10, wherein the computer usable program code to generate the response page having hidden fields further comprises computer usable program code to:

locate the set of forms of the response page; and
populate the set of forms with hidden fields comprising the serialized session data.

12. The apparatus of claim 10, wherein the computer usable program code to generate the response page having hidden fields further comprises computer usable program code to:

generate hidden field objects storing the serialized session data; and insert the hidden field objects into the set of forms of the response page.

13. An apparatus for managing session data, the apparatus comprising:

a memory storing program instructions, and at least one processing unit for executing the program instructions, the program instructions including:

a web application, wherein the web application generates session data in a first session object in the web application associated with a request for content in response to an absence of preexisting serialized session data from a serialized session object being associated with the request and wherein the web application creates a serialized session data from the first session object;

a data object session component, wherein the data object session component calculates a message authentication code using a timestamp, the serialized session data, and a security key, and populates hidden fields with the serialized session data, the timestamp, and the message authentication code;

a servlet container, wherein the servlet container generates a response page having the hidden fields, and wherein the servlet container sends the response page to a browser; and a session reconstruction component, wherein the session reconstruction component de-serializes the preexisting serialized session data to form de-serialized session data and processes the request using the de-serialized session data in response to a presence of the preexisting serialized session data being associated with the request, and wherein the preexisting serialized session data is in a set of hidden fields.

14. The apparatus of claim 13, further comprising:

a client computer, wherein the client computer hosts the browser for generating the request for content and receives a response page in response to submitting the request for content.

* * * * *